United States Patent [19]

Sado

[11] Patent Number: 4,590,560
[45] Date of Patent: May 20, 1986

[54] ELECTRONIC APPARATUS HAVING DICTIONARY FUNCTION

[75] Inventor: Ichiro Sado, Tokyo, Japan

[73] Assignee: Canon Kabushiki Kaisha, Tokyo, Japan

[21] Appl. No.: 593,191

[22] Filed: Mar. 27, 1984

Related U.S. Application Data

[63] Continuation of Ser. No. 514,358, Jul. 15, 1983, abandoned, which is a continuation of Ser. No. 184,754, Sep. 8, 1980, abandoned.

[30] Foreign Application Priority Data

Sep. 14, 1979 [JP] Japan .................. 54-118245

[51] Int. Cl.⁴ .................. G06F 15/20; G06F 15/40
[52] U.S. Cl. .................. 364/419; 364/900; 434/156; 434/169
[58] Field of Search ... 364/200 MS File, 900 MS File, 364/419, 710, 715; 434/156–157, 169

[56] References Cited

U.S. PATENT DOCUMENTS

| | | | |
|---|---|---|---|
| 3,932,859 | 1/1976 | Kyriakides et al. | 364/900 |
| 3,938,099 | 2/1976 | Hyder | 364/900 |
| 3,950,734 | 4/1976 | Li | 364/900 |
| 4,051,606 | 10/1977 | Tozo | 434/157 X |
| 4,122,533 | 10/1978 | Kubinak | 364/900 |
| 4,130,882 | 12/1978 | Swanstrom et al. | 364/900 |
| 4,158,236 | 6/1979 | Levy | 364/900 |
| 4,159,536 | 6/1979 | Kehoe et al. | 364/900 |
| 4,177,578 | 12/1979 | Yamamoto | 434/157 X |
| 4,193,119 | 3/1980 | Arase et al. | 364/900 |
| 4,218,760 | 8/1980 | Levy | 364/900 |
| 4,406,626 | 9/1983 | Anderson et al. | 434/169 |
| 4,428,065 | 1/1984 | Duvall et al. | 364/900 |

Primary Examiner—Gary V. Harkcom
Attorney, Agent, or Firm—Fitzpatrick, Cella, Harper & Scinto

[57] ABSTRACT

Electronic apparatus with dictionary function which includes information input ports, memory facility for storing words, retrieval facility for retrieving a word related to the information in response to information entered as well as indication of the presence of subsidiary information where such subsidiary information is stored.

7 Claims, 3 Drawing Figures

ELECTRONIC APPARATUS HAVING DICTIONARY FUNCTION

This application is a continuation of application Ser. No. 514,358 filed July 15, 1983, now abandoned, which in turn is a continuation of application Ser. No. 184,754, filed Sept. 8, 1980, now abandoned.

BACKGROUND OF THE INVENTION

1. Field of the Invention

The present invention relates to an electronic apparatus capable of retrieving words or the like.

2. Description of the Prior Art

An advantage of an electronic dictionary lies in the ease of retrieval. For example a word "spelling" can be retrieved by entering a part "spell" instead of the input of the entire word, if there exist no other corresponding words. Another advantage of such electronic dictionary lies in the ease of retrieving irregular conjugations of verbs or comparative and superlative of adjectives from a solid-state memory in comparison with the conventional dictionary in which such words have to be found for example from a table usually attached at the end of the dictionary.

However in the electronic dictionaries designed with emphasis on portability, it is often difficult, within a limited display unit, to display the above-mentioned conjugations, long words or a sentence which therefore have to be displayed in divided forms.

SUMMARY OF THE INVENTION

In consideration of the above-mentioned drawback, the object of the present invention is to provide an electronic apparatus with improved dictionary function.

Another object of the present invention is to provide an electronic apparatus enabling easily visualization of the conjugations of a displayed word or the spelling of a long word which cannot be displayed at one time.

Still other objects and advantages of the present invention will be made apparent from the following description of the embodiments thereof to be taken in conjunction with the attached drawings.

DESCRIPTION OF THE PREFERRED EMBODIMENTS

Now reference is made to the attached drawings showing an embodiment of the present invention.

Figure 1:
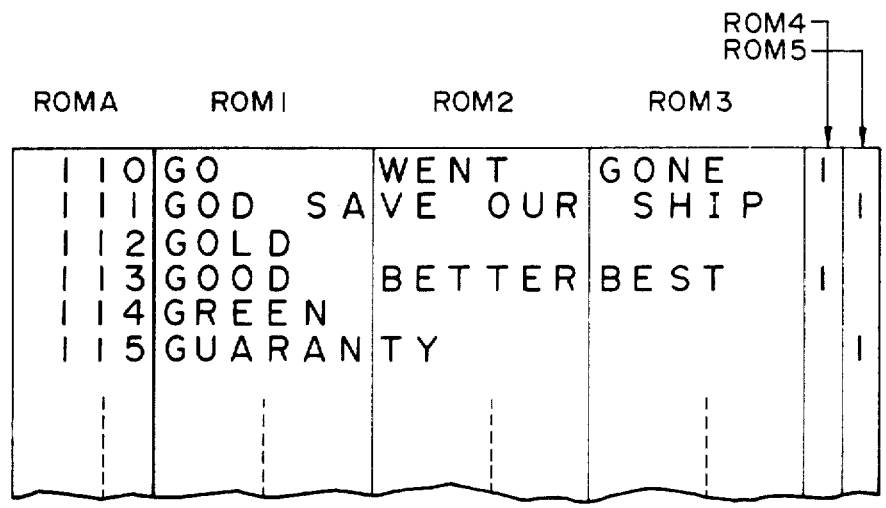
FIG. 1 is a schematic view of the solid-state memory device for information storage.

FIG. 1 shows the content of the information stored in a solid-state memory device (hereinafter called ROM) to be employed in the electronic apparatus of the present invention, wherein the actual binary codes are replaced by numerals and characters for facilitating the understanding. In said memory ROM there is provided an address section ROMA storing the addresses of said memory ROM.

ROM1 is a first memory section for storing, corresponding to the address section ROMA, the spellings of words which are retrieved and displayed by alphabet key actuations.

ROM2 is a second memory section for storing, corresponding to the first memory section ROM1, the past forms or comparative forms of the words stored therein or the remaining portions of the words that cannot be accommodated therein.

ROM3 is a third memory section for storing, corresponding to the first memory section ROM1, the past participle forms and superlative forms of the words stored therein or the remaining portions of the words that cannot be accommodated in the first and second memory sections ROM1, ROM2.

ROM4 is a fourth memory section for storing, corresponding to the address section ROMA, a logic-1 signal in case the word corresponding to an address contains conjugated forms.

ROM5 is a fifth memory section for storing, corresponding to the address section ROMA, a logic-1 signal in case a word corresponding to an address is stored in other memory sections in addition to the first memory section ROM1.

Figure 2:
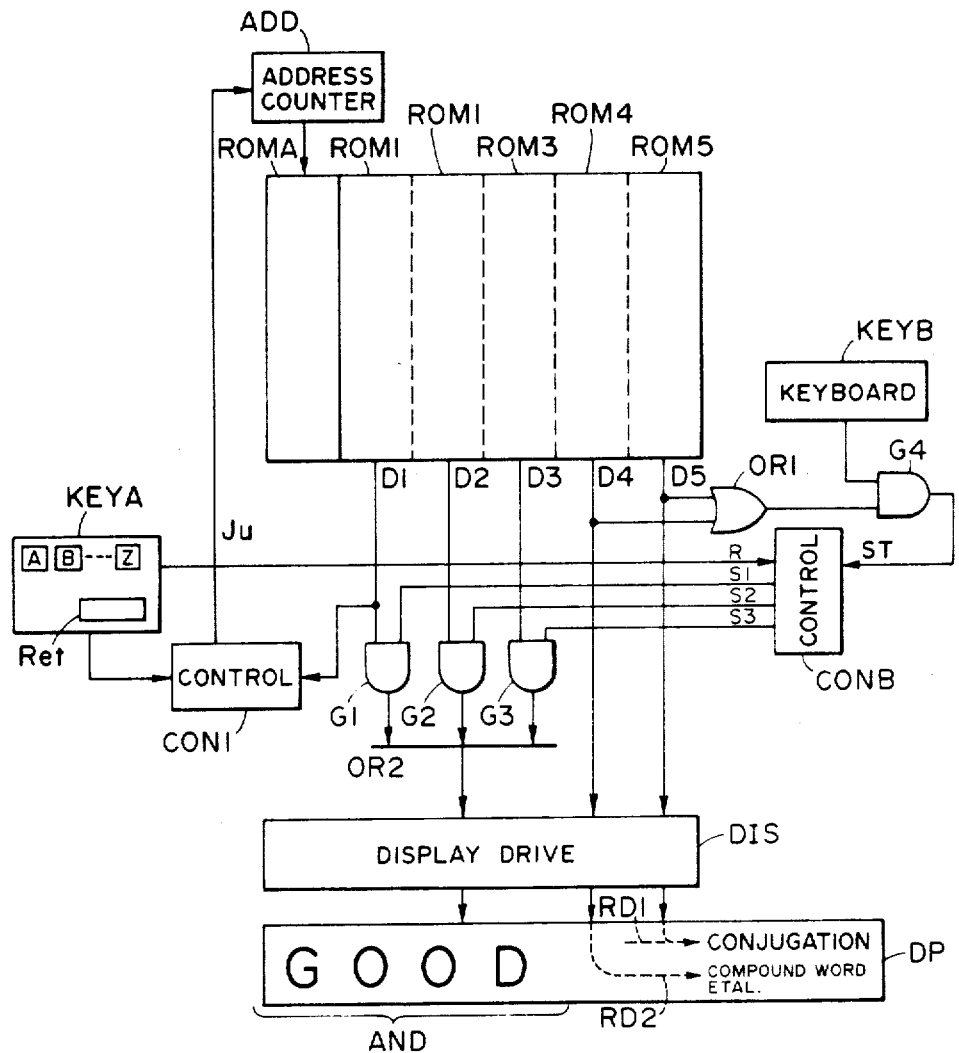
FIG. 2 is a block diagram showing an embodiment of the present invention.

FIG. 2 is a block diagram of an embodiment of the present invention, wherein ROMA and ROM1 to ROM5 correspond respectively to those shown in FIG. 1. KEYA is a first key input unit consisting for example of character keys, retrieval instruction key, etc.

KEYB is a second key input unit for causing the display of information, for example word conjugations, related to the displayed content.

CON1 is a first control unit for comparing a key code KC of the alphabet key actuated in the first key input unit KEYA with a signal D1 supplied from the first memory section ROM1. This is achieved by a coincidence circuit which compares the binary alphabet code stored in the first memory section ROM1 with the binary alphabet code instructed from the first key input unit KEYA, and releases the result of such comparison through a signal line JU to an address counter ADD for controlling the address section ROMA. Said address counter ADD changes the selected address, generally by step advancement, in response to a non-coincidence signal supplied through the line JU, and terminates such address changing when a coincidence signal is supplied through said line JU. In this manner the spelling entered by the keys is introduced into said first control unit CON1 in response to the actuation of the retrieval key Ret, and the address is changed until a coinciding code is obtained from the signal line D1. Such a process is instantaneously completed by a large-scale integrated circuit according to the clock pulses therefor.

There are also shown a first OR gate OR1 for providing the sum of the signals from the line D4 of the fourth memory section ROM4 and from the line D5 of the fifth memory section ROM5; an AND gate G4 for receiving the output signals from the OR gate OR1 and from the second key input unit KEYB to release a logic-1 signal for a determined period in response to the actuation of keys; and a signal line ST for transmitting the output signal from the AND gate G4 to provide instruction to a second control unit CONB to advance a counter therein when said signal is at the logic-1 state. In response to the actuation of the retrieval key Ret in the first key input unit KEYA, the second control unit CONB resets the counter therein through a signal line R and releases a logic-1 signal to the signal line S1, then advances the counter to release logic-0 and logic-1 signals respectively to the signal lines S1 and S2 when the signal line is shifted to the logic-1 state, and further releases logic-0 and logic-1 signals to the signal lines S2 and S3 when the signal line ST assumes the logic-1 state next time.

In response to the control by said second control unit CONB, the signals through the line D1 are supplied to the display drive unit DIS through the AND gate G1 and an OR gate OR2 when the signal line S1 is set at the logic-1 state, while the signals through the line D2 are supplied to said display drive unit DIS through an AND gate G2 and the OR gate OR2 when the signal line S2 is set at the logic-1 state, and the signals through the line D3 are supplied to said display drive unit DIS through an AND gate G3 and the OR gate OR2 when the signal line S3 is set at the logic-1 state.

The output signals from the fourth and fifth memory sections ROM4, ROM5 are also supplied to said display drive unit DIS to respectively display, in logic-1 states thereof, a conjugation symbol RD1 or a continued-word symbol RD2 on a display unit DP.

The display drive unit DIS transmits the signals from the OR gate OR2 and signal lines D4, D5 to the display unit DP.

The display unit DP is provided with alphanumeric display elements AND, an arrow display element RD1 for indicating the presence of conjugated forms, and an arrow display element RD2 for indicating the presence of a continuing portion of word.

Now the function of the foregoing embodiment will be explained while making reference to FIGS. 1 and 2. If the word "GOOD" is entered by the keys of the first key input unit KEYA, a binary code for said word "GOOD" is supplied in response to the actuation of the retrieval key Ret to the first control unit CON1 and compared with the signals supplied through the signal line D1, thus selecting the address 113 (cf. ROMA in FIG. 1) providing the coinciding code. The logic-1 signal stored in the fourth memory section corresponding to said address 113 activates the arrow display unit RD1 showing a conjugation signal. In this state the display unit displays the signals "GOOD" supplied through the signal line D1, since the second control unit CONB releases a logic-1 signal to the line S1. Upon actuation of the second key input unit KEYB in this state, the signal line D4 which is at the logic-1 state provides logic-1 signals both from the OR gate OR1 and the AND gate G4, whereby the signal line S2 is selected to display the signals for a word "BETTER" from the signal line D2 on the display elements AND. Furthermore, upon reactuation of the second key input unit KEYB the signals for a word "BEST" supplied through the signal line D3 are displayed on the display elements AND through a similar procedure.

In the embodiment just described, the memory can be thought of as comprising a plurality of first memory areas each corresponding, for example, to the portions of ROM 1, ROM 2 and ROM 3 corresponding to a particular address, and a plurality of second memory areas corresponding, for example, to ROM 5, wherein each second memory area stores information indicating whether the corresponding first memory area contains a sentence (which terms, as used herein and in the claims, includes any phrase or a complete sentence, or any string of characters too long to fit in the ROM 1 portion of that first memory area) rather than only a single word.

Figure 3:
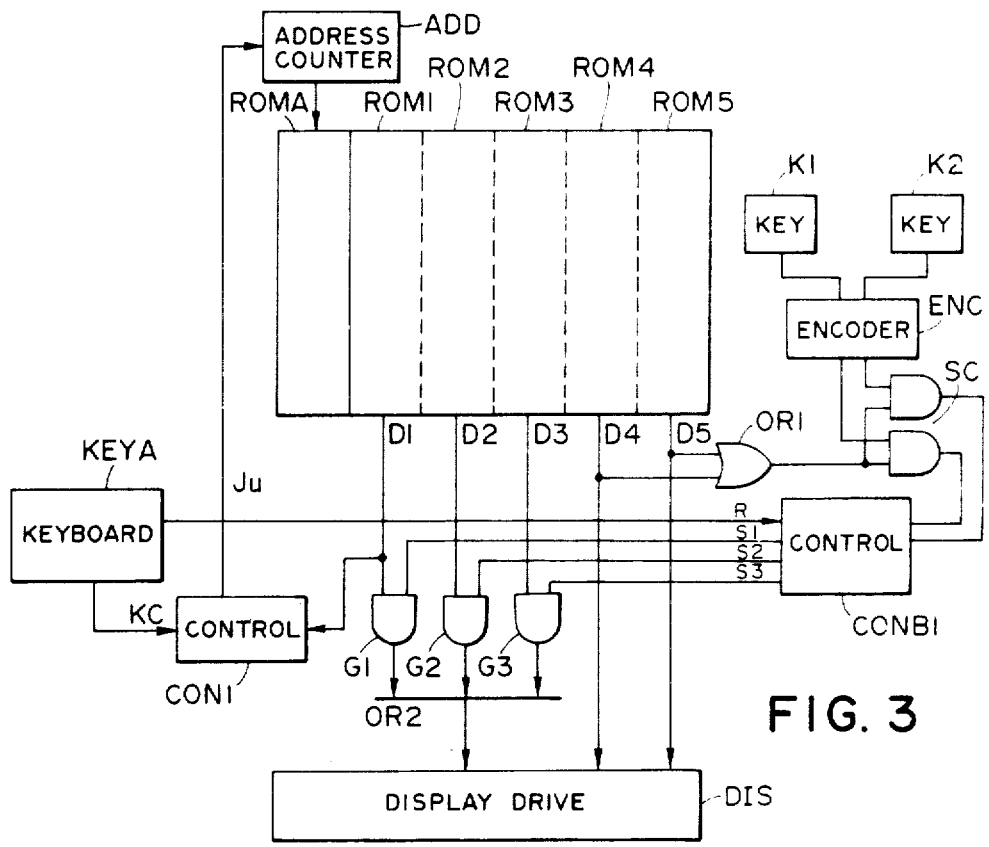
FIG. 3 is a block diagram showing another embodiment of the present invention.

FIG. 3 is a block diagram showing another embodiment of the present invention, in which, in contrast to the foregoing embodiment utilizing step increase or decrease of a counter in the second control unit CONB by the signals from the second key input unit KEYB, there are provided keys of a number corresponding to that of the conjugations of a word, thereby enabling immediately visualization of the desired conjugated form.

More specifically in this embodiment there are provided a key K1 indicating the past or comparative form and another key K2 indicating the past participle or superlative form, and, upon actuation thereof, an encoder ENC generates respectively corresponding signals which are supplied, through a gate circuit SC controlled by the output signal from the OR gate OR1, to a control unit CONB1.

Said control unit CONB1 is provided with an unrepresented latch circuit for receiving the signal from said gate circuit SC and an unrepresented decoder circuit for decoding the content of said latch circuit, but is constructed, in the remaining portion, in the same manner as explained in the foregoing embodiment. The control unit CONB1 is so constructed as to reset the latch circuit upon receipt of a reset signal supplied from the key input unit KEYA through the signal line R, and to release a signal to the signal line S1 for opening the gate G1 according to the content of the latch circuit. Upon actuation of the key K1 the encoder ENC releases an encoder signal which is stored in the latch circuit in the control unit CONB1, and thus stored content is supplied through the decoder to the signal line S2 to open the gate G2, thereby causing the display of the content of the second memory section ROM2. Similarly the content of the third memory section ROM3 is displayed upon actuation of the key K2. In this manner it is rendered possible to obtain the desired information quickly.

Also from the foregoing explanation it will be apparent that, when a determined symbol is displayed on the display unit, the ensuing part of the spelling is supplied to the display unit in response to the actuation of a particular key KEYB.

It is furthermore possible to store plural form, antonym, synonym or translation of the words in the second memory section ROM2 corresponding to those stored in the first memory section ROM1 and to easily display these words through the actuation of particular keys, thus achieving an efficient utilization of the memory device ROM.

The successive output of different forms or different words through the operation of a single particular key is advantageous in achieving a compact portable apparatus.

The present invention is also applicable to a portable system in which the addresses of the memory device are selected not by the alphabet keys but by the output signals of a random number generator display the words in a random order, since such a system is easily obtainable by omitting KEYA, ADD and CON1 from the circuit shown in FIG. 2, supplying the output signals of a random number generator to the address section ROMA, supplying the signal R to the control unit CONB at each generation of a random number and adding a key for instructing the random number generation.

What I claim is:

1. An electronic apparatus, comprising:

a first memory area for storing a plurality of words which each have conjugations, and a plurality of words which each have no conjugations therein;

a second memory area for storing first conjugations of the plurality of words having conjugations stored in said first memory area;

a third memory area for storing second conjugations of the plurality of words having conjugations stored in said first memory area;

a fourth memory area for storing data indicating that a particular part of said first memory area, said second memory area or said third memory area stores conjugations of words;

retrieval means for retrieving at least one of said words stored in said first memory area;

instruction means for selectively instructing retrieval of at least one word in said second memory area corresponding to said at least one word of said first memory retrieved by said retrieval means, or retrieval of at least one word in said third memory area corresponding to said at least one word of said first memory area retrieved by said retrieval means; and display means for displaying said word retrieved by said retrieval means from said first memory area or said word retrieved from said second or said third memory area at the instruction of said instruction means, and said data stored in said fourth memory area.

2. An electronic apparatus according to claim 1, wherein said instruction means comprises first key means for instructing retrieval of a word of said second memory area, and second key means for instructing retrieval of a word of said third memory area.

3. An electronic apparatus according to claim 1, wherein said instruction means comprises key means, and wherein upon actuation of said key means once said instruction means instructs retrieval of a word of said second memory area and upon two successive actuations of said key means said instruction means instructs retrieval of a word of said third memory area.

4. An electronic apparatus according to claim 1, wherein said fourth memory area is for storing information corresponding to a word in said first memory area and indicating that said second memory area or said third memory area stores information corresponding to said word in said first memory area, and said display means is for displaying information stored in said fourth memory area.

5. An electronic apparatus, comprising:

a plurality of first memory areas for storing a plurality of words which have conjugations, a plurality of conjugations of said words, a plurality of words which each have no conjugation and a plurality of sentences;

a plurality of second memory areas each for storing information corresponding to a respective one of said first memory areas which indicates whether or not a sentence is stored in said respective first memory area;

a plurality of third memory areas for storing information which indicates whether or not conjugations of words are stored in respective ones of said first memory areas; and display means for displaying a word or a portion of a sentence of said first memory area, and corresponding information of the corresponding said second memory area and said third memory area.

6. An electronic apparatus according to claim 5 further comprising retrieval means for retrieving words and sentences stored in said first memory areas.

7. An electronic apparatus according to claim 5, wherein said plurality of third memory areas are for storing conjugated forms of words stored in said plurality of first memory areas.

* * * * *